US008562874B2

(12) United States Patent
Chow et al.

(10) Patent No.: US 8,562,874 B2
(45) Date of Patent: Oct. 22, 2013

(54) METHOD FOR PREPARATION OF WELL-DISPERSED, DISCRETE NANOPARTICLES BY SPRAY DRYING TECHNIQUES (75) Inventors:

METHOD FOR PREPARATION OF WELL-DISPERSED, DISCRETE NANOPARTICLES BY SPRAY DRYING TECHNIQUES

CROSS REFERENCE TO RELATED APPLICATION

This is a utility application incorporating by reference and claiming priority to previously filed provisional application Ser. No. 61/447,504 filed Feb. 28, 2011 entitled "Method for Preparation of Well-Dispersed $CaF_2$ Nanoparticles by Spray Drying Techniques".

BACKGROUND OF THE INVENTION

In a principal aspect, the present invention relates to a spray drying process for preparation of discrete nanosized particles, such as $CaF_2$ particles, that are not agglomerated.

Calcium fluoride ($CaF_2$) or '$CaF_2$-like' materials are of significant interest in caries prevention as they have been suggested to be the major source of labile fluoride (F) in the oral environment after F treatments. The release of F from the labile store of loosely bound F in the oral cavity environment increases the mineral saturation of oral fluid, and can promote the repair of lesions and reduce demineralization during cariogenic attack. However, a conventional sodium fluoride (NaF) rinse can only lead to very small amounts of $CaF_2$ deposit formation due to the low concentration of free calcium (Ca) ions in the mouth. In contrast, more $CaF_2$ deposits in the oral environment have been found to significantly increase the remineralization effects of the F treatment without increasing the F levels.

Previously reported is the preparation of a nano $CaF_2$ that has a theoretical spherical particle size of 41 nm based on BET (Brunauer-Emmett-Teller) surface area measurements. When used as the F source in an oral rise, these nano $CaF_2$ were shown to produce a greater F deposition than a NaF rinse of the same F dose in both in vitro and in vivo studies. However, electron microscopic observations indicated that the $CaF_2$ material consisted primarily of $CaF_2$ agglomerates, about 300 nm to 800 nm in size, but that the agglomerates, were made up of much small primary $CaF_2$ particles of <50 nm in size. These agglomerates were not readily dispersed into the primary $CaF_2$ particles by ultrasound processing, indicating that the primary $CaF_2$ particles in each cluster were tightly held together. However, there is strong evidence that significantly greater F efficacies can be achieved if the nano $CaF_2$ or agglomerates can be dispersed into the smaller primary particles. Unwanted agglomeration of nanoparticles due either to the preparation process or post synthesis treatments has thus remained a problem.

SUMMARY OF THE INVENTION

Briefly, the present invention comprises a method or process for preparation of dispersed nanosized particles, such as $CaF_2$ particles, by forming the particles in a soluble salt matrix, such as NaCl, using a spray drying apparatus similar in some aspects to that reported in *Preparation and properties of nano-sized calcium fluoride for dental applications*. Dent Mater 2008;24(1):111-116 incorporated herein by reference. As an example of the invention, the spray drying process leads to co-precipitation of $CaF_2$ and NaCl in the form of a cluster consisting of $CaF_2$ primary and discrete particles distributed in a matrix of NaCl. When exposed to an aqueous solution, the dissolution of NaCl will lead to the dispersion of the solid primary $CaF_2$ particles that may be collected for appropriate therapeutic use. This method can produce well dispersed, desirably sized nano $CaF_2$ primary particles, which can be used as a more effective anti-caries agent in rinses or dentifrices, for example.

The method also has application in the formation of other nanosized particulates of various compounds. Generally, the process involves solubilizing appropriate precursor compounds in chosen solvents and then simultaneously dry spraying the discrete solutions together to enable the ionic components to interact or bond thereby forming compounds of highly different or distinct solubility. By spray drying the two and possibly more solubilized compounds, agglomerated but discrete, solid nanoparticles are formed in a solid but soluble matrix. The matrix which is formed has a solubility in a chosen solvent significantly greater than the particles, thus enabling collection of the discrete, agglomerated particles by dissolving the matrix and capturing the particles.

Thus, it is an object of the invention to provide a method for the avoidance of agglomerated clusters of particles, such as $CaF_2$ particles, and thus provide particles generally of less than 50 nm in size (BET measurement) and 300 nm (dynamic light scattering (DLS) measurement).

It is a further object of the invention to provide a method for efficiently making calcium $CaF_2$ particles less than 300 nanometers (DLS) in size with greatly reduced agglomeration as a result of the processing steps associated with the creation of such particles.

Yet another object of the invention is to provide techniques for the creation of $CaF_2$ particles less than 300 nanometers (DLS) in size for their use to significantly increase remineralization effects of the fluoride treatment in effecting caries prevention.

Another object of the invention is to provide a method for making discrete, solid particles of various compounds having a size of nanometer dimension.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF REPRESENTATIVE EMBODIMENTS OF THE INVENTION

The following examples of the process is directed to the manufacture of discrete particles of $CaF_2$ having a size generally less than 300 nm and includes the steps of (1) providing at least a first fluoride solution and a discrete calcium solution, (2) simultaneously ejecting said solutions by means of a dual spray drying apparatus in a manner wherein the spray is simultaneously ejected from the spray nozzle(s) in a pattern that effectively co-mingles the sprayed solutions (3) collecting the particulates resulting from the spray drying operation which are in view of the solutes chosen comprised of generally separate $CaF_2$ particles in a soluble, biocompatible matrix, and (4) dissolving the matrix and collecting the $CaF_2$ particles. Enabling the process requires appropriate choices of solvents and solutes based upon their ionic reactivity and compound solubility.

Example A

Preparation of Nano $CaF_2$/NaCl Particles

The nano $CaF_2$/NaCl particles were prepared using the spray drying system generally described in *On the role of calcium fluoride in the cariostatic mechanism of fluoride*. Acta Odontol Scan 1988; 46:341-345, incorporated herewith by reference In the preparation of pure nano $CaF_2$, a 4 mmol/L $Ca(OH)_2$ solution and an 8 mmol/L $NH_4F$ solution were, following preparation, simultaneously fed to the 2-liquid nozzle of a spray drying apparatus. To incorporate NaCl, NaCl of concentrations of (1.4, and 16) mmol/L were added to both the $NH_4F$ and Ca ($OH_2$) solutions, respectively. This led to the formation of ($CaF_2$+NaCl) composites with $CaF_2$/NaCl molar equivalent ratios of 4:1, 1:1, and 1:4, or mass ratios 5.34, 1.31 and 0.33 (Table 1). Pure nano $CaF_2$ particles were also prepared as the control. All solutions were prepared using reagent grade chemicals and mole ratios of $CaF_2$/NaCl in the range of 10:1 to 1:10 are considered within the scope of the process.

The reaction of the solutions led to the formation of ($CaF_2$+NaCl) composite particles and $NH_4F$ (Eqn. 1). The ($CaF_2$+NaCl) composite of particles and matrix was collected at the end of the process, while the $NH_4OH$ was removed as $NH_3$ and $H_2O$ vapors with the air flow $$Ca(OH)_2 + NH_4F + NaCl \rightarrow CaF_2 + NaCl + NH_3\uparrow + H_2O\uparrow \quad \text{(Eqn. 1)}$$

Microstructural Characterization of Nano $CaF_2$/NaCl Particles

The obtained nano powders were characterized by powder X-ray diffraction (XRD), DMAX 2200, Rigaku Denki, Woodlands, Tex.) for crystalline phase identification. Scans were performed between 10°<2θ<60°. The estimated standard uncertainty of the 2θ measurement is 0.01°. The morphology and composition of the initially collected particulate material (powder) was examined using scanning electron microscopy (SEM, JSM-5300, JEOL, Peabody, Mass.) and X-ray energy dispersive spectroscopy (XEDS, equipped in Hitachi S-4700 SEM, Pleasanton, Calif.). The SEM samples were prepared by depositing the powder onto aluminum stubs or carbon tapes (to reduce the A1 interference in XEDS spectrum) from a well-sonicated dilute suspension in pure ethanol. The size distribution of the powders was determined by dynamic light scattering (DLS, Zetaszier, Malvern Instrument, Westborough, Mass.) at a wavelength of 532 nm at 25° C. using a well-sonicated dilute suspension in distilled water (0.25 mg/ml $CaF_2$) as the only particulate matter in the suspension. In order to keep the NaCl concentration constant for all suspensions, an appropriate amount of NaCl solid was added to each of the suspensions such that the NaCl concentration was the same as that in sample $CaF_2$-3 (12.8 mmol/L).

To investigate if the $CaF_2$ can be readily dispersed after the NaCl was dissolved, samples of $CaF_2$/NaCl composite powders were washed with distilled water first to dissolve the NaCl, and then centrifuged at (48,000 g) for 10 min (J2-21, Beckman, Brea, Calif.). The solid sediments which should consist of pure $CaF_2$ were then collected for preparing well-sonicated dilute suspension in pure ethanol for SEM examination and DLS measurement. The sediments were also dried in air for BET and DLS characterization. Multipoint BET surface area analyses were done with ultra high purity nitrogen as the adsorbate gas and liquid nitrogen as the cryogen (ASAP 2020 Surface Area & Porosity Analyzer, Micromeritics, Norcross, Ga.). All samples were degassed at 105° C. for 1 hour and then held at 105° C. for 2 hours with ultra high purity nitrogen purge before the measurement. The estimated standard uncertainty of the BET measurement was 0.15% of the reading. The particle size of the primary crystals of $CaF_2$ was estimated from the BET surface area by calculating equivalent spherical diameter, or BET particle diameter ($d_{BET}$), from the fundamental equation: $d_{BET} = 6/(p\ S_W)$, where p is the theoretical density of the $CaF_2$ (3.14 g/cm$^3$) and $S_W$ is the specific surface area (see Ring, TA. *Fundamentals of Ceramic Powder Processing and Synthesis*. San Diego; Academic Press; 1996).

Figure 1:
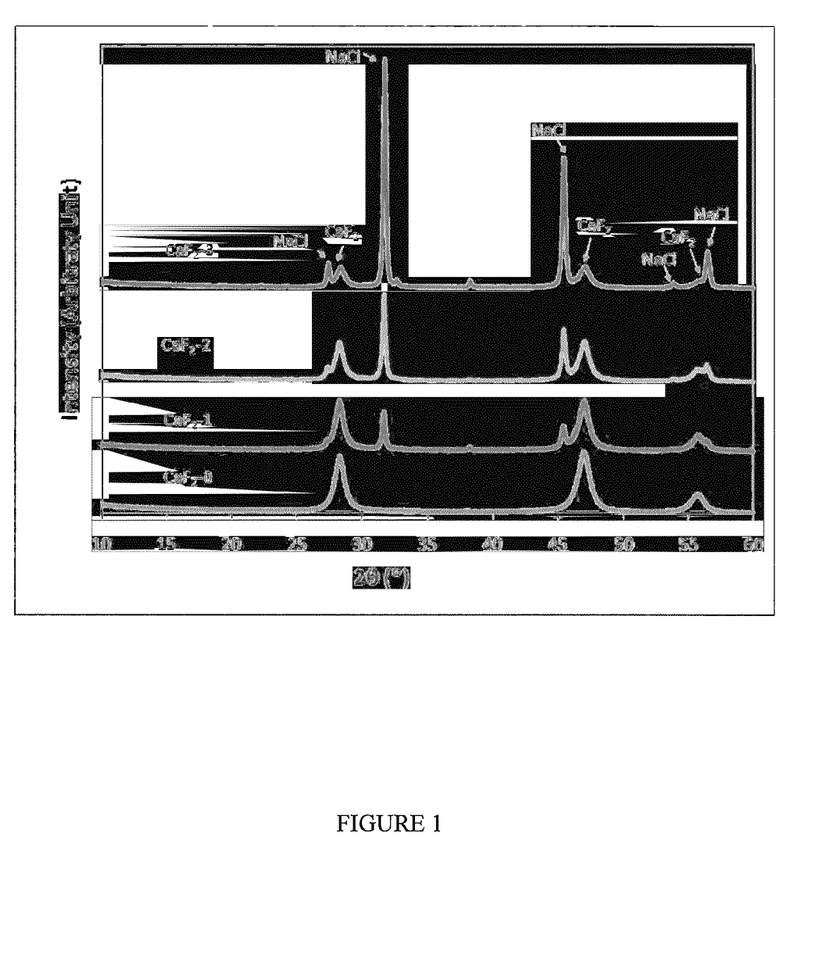
FIG. 1: X-ray diffraction (XRD) patterns of CaF2/NaCl composite nano particles prepared by spray drying techniques. 215×166 mm (600×600 DPI).

XRD patterns of the obtained powders (FIG. 1) showed that the powders include both $CaF_2$ and NaCl phases and their ratios corresponded to the ones in the starting solution. No traces of other phases such as $Ca(OH)_2$, $NH_4F$, $CaCl_2$ or NaF were detected. The peaks of the $CaF_2$ were relatively broad compared to those of NaCl, suggesting a finer crystal size or less perfect crystal structure for the $CaF_2$. The distilled water-washed samples contained only $CaF_2$ as their XRD patterns (not shown) were similar to that of the $CaF_2$-0 sample, showing $CaF_2$ peaks that are much broader when compared to those of the commercial micro-sized $CaF_2$.

Figure 2:
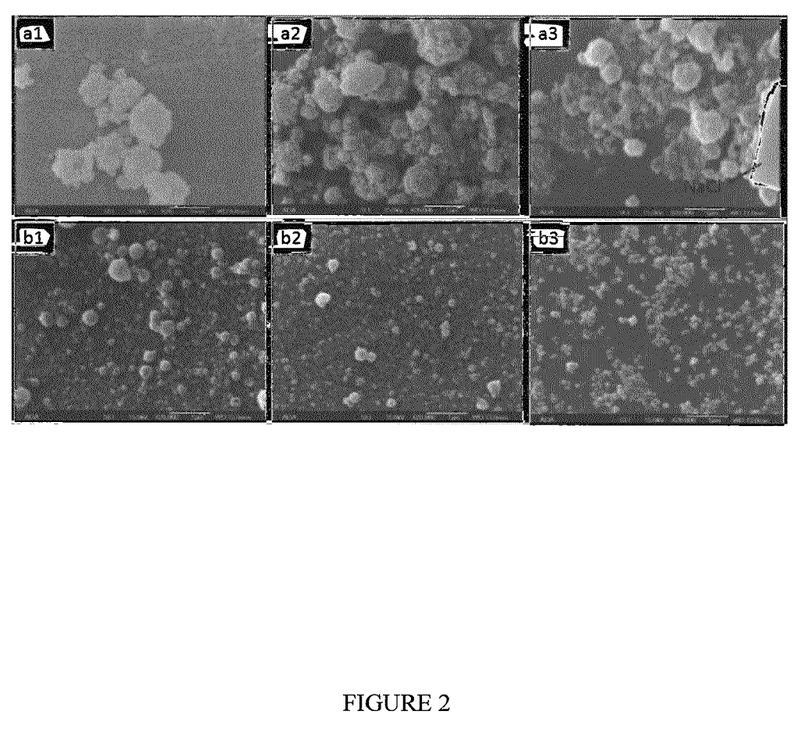
FIG. 2: Scanning electron microscope (SEM) morphology of nano $CaF_2$/NaCl composite particles prepared by spray drying techniques wherein patterns a1, a2, a3 are respectively as-prepared $CaF_2$-1, $CaF_2$-2, $CaF_2$-3; and patterns b1, b2, b3 are respectively $CaF_2$-1, $CaF_2$-2 and $CaF_2$-3 redispersed in ethanol after washing with distilled water. 330×176 mm (72× 72 DPI)>
Figure 3:
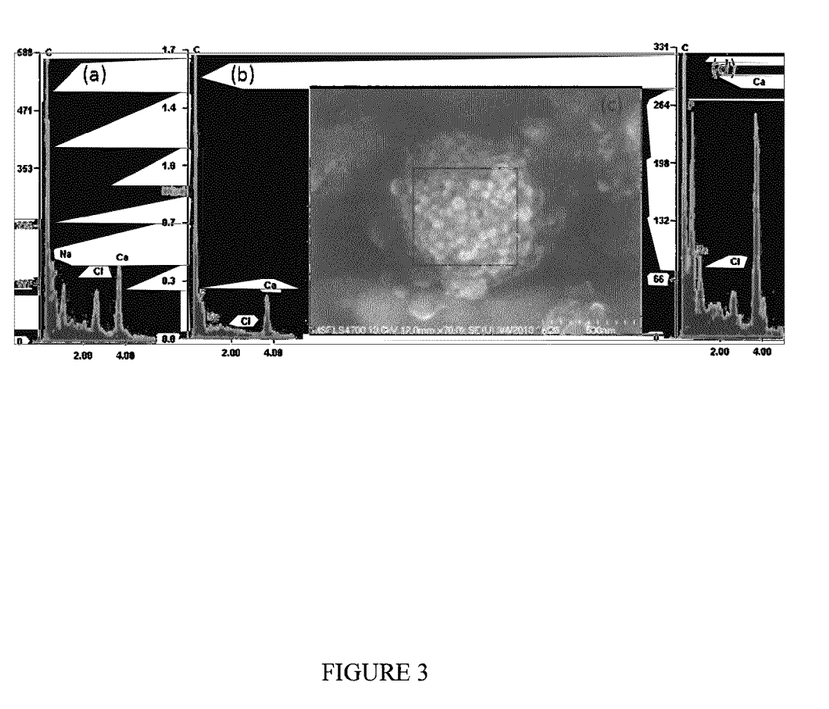
FIG. 3: SEM and EDS of nano $CaF_2$/NaCl composite particles prepared by spray drying techniques: (a) as prepared sample (at ×5k), (b) washed sample (at ×5k), (c) SEM of a single nano cluster in as prepared sample (at ×70k), (d) EDS spectrum of the single nano cluster (area within the rectangle shown in c). 294×128 mm (72×72 DPI).

SEM examinations (FIG. 2) showed that the as-prepared powder ranged from about 50 nm to 800 nm in size. Also, these powders exhibited numerous spherical protuberances on the surfaces, suggesting that they were formed during the spray drying process through aggregation of the much smaller primary particles. In strong contrast, after washing with distilled water, the material dispersed into much small particles of about 100 nm or less (FIG. 2). The particles became better dispersed with fewer and smaller agglomerates when a greater amount of NaCl was incorporated in the composite clusters during the preparation, and subsequently dissolved in the water. However, when the percentage of NaCl incorporation was very high, such as in the case of sample $CaF_2$-3, some NaCl crystals could form separately, rather than as the part of the composite clusters (FIG. 2 (a3)). EDS indicated that the nano composite clusters or powders in as-sprayed samples contained CA, F, Na, and Cl, confirming that the samples contained both $CaF_2$ and NaCl (FIG. 3).

In comparison, the washed samples contained essentially Ca and F only. However, the $CaF_2$/NaCl ratio in a single before-wash composite cluster (intensity of Ca/Na is≈2.7)

appeared to be higher than the average ratio (intensity of Ca/Na is≈13) in the bulk sample, suggesting that the $CaF_2$/NaCl precipitation may not be homogeneous. This may also explain the SEM observation that some NaCl precipitated as a separate phase as described above.

Figure 4:
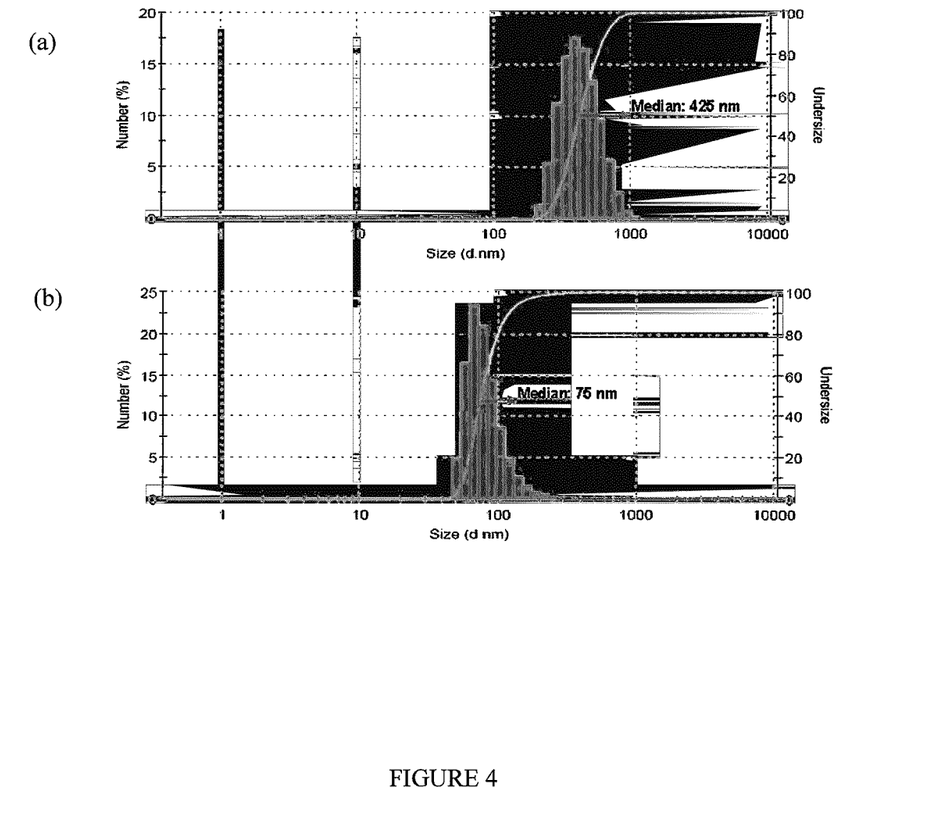
FIG. 4: Particle size distribution graphs of a pure nano $CaF_2$ sample ($CaF_2$-0, (a) graph) and a distilled water-washed nano $CaF_{2+}$NaCl composite sample ($CaF_2$-3, (b) graph). 267×190 mm (600×600 DPI).

The DLS measurement in 12.8 mmol/L NaCl solution (Table 2) showed that the mean particle size (z-average) of $CaF_2$ nanoparticles were greatly reduced when the NaCl was co-precipitated during spray drying and subsequently dissolved in water. The size reduction was greater when more NaCl was incorporated in the composite. The DLS measurement of the distilled water-washed samples dispersed in ethanol (Table 2) showed a similar trend, but the average sizes were smaller and closer to the particle sized observed by SEM. FIG. 4 compares the representative particle size distribution of samples $CaF_2$-0 and $CaF_2$-3 (washed) in ethanol. The pure $CaF_2$ sample exhibited a particle size distribution of (200 to 1000) nm with the median value at 425 nm, while the washed $CaF_2$-3 sample had a distribution of (45 to 200) nm with the median value at 75 nm. These results, which were in good agreement with the SEM observations, showed that the effective median particle size was decreased by nearly 6-fold. The BET specific surface areas of the washed $CaF_2$ powders ranged between (49 to 63) $m^2/g$ (Table 2) and the estimated equivalent spherical particle sizes ($d_{BET}$) were (30 to 39) nm. These latter values were similar to the size of the primary particles observed in SEM (FIG. 3), suggesting that the BET particle size values corresponded to those of the primary particles, which were similar in all $CaF_2$ preparations with a mean value of (36±4) nm.

TABLE 1

Compositions of the starting solutions used for preparing nano-sized $CaF_2$/NaCl

| Sample | $Ca(OH)_2$ (mmol/L) | $NH_4F$ (mmol/L) | NaCl (mmol/L) | $CaF_2$/NaCl molar equivalent ratio | $CaF_2$/NaCl mass ratio |
|---|---|---|---|---|---|
| $CaF_2$-0 | 2 | 4 | 0 | | |
| $CaF_2$-1 | 2 | 4 | 1 | 4:1 | 5.34 |
| $CaF_2$-2 | 2 | 4 | 4 | 1:1 | 1.33 |
| $CaF_2$-3 | 2 | 4 | 16 | 1:4 | 0.33 |

TABLE 2

DLS particle size, BET specific surface area and degree of agglomeration of nano $CaF_2$

| Sample | $CaF_2$-0 | $CaF_2$-1 | $CaF_2$-2 | $CaF_2$-3 |
|---|---|---|---|---|
| DLS Z-average particle size in 12.8 mmol/L water solution, $d_{DLS1}$ (nm) (n = 3) | 1015 ± 70 | 425 ± 6 | 367 ± 6 | 219 ± 4 |
| DLS Z-average particle size in ethanol, $d_{DLS2}$ (nm) (n = 3) | 455 ± 6 | 246 ± 8 | 197 ± 5 | 158 ± 3 |
| BET specific surface area, Sw ($m^2/g$) | 49 | 53 | 49 | 63 |
| BET equivalent spherical particle size, $d_{BET}$ (nm) | 39 | 36 | 39 | 30 |
| Degree of Agglomeration (DA) | 2020 | 319 | 164 | 85 |

Process Characterization

Figure 5:
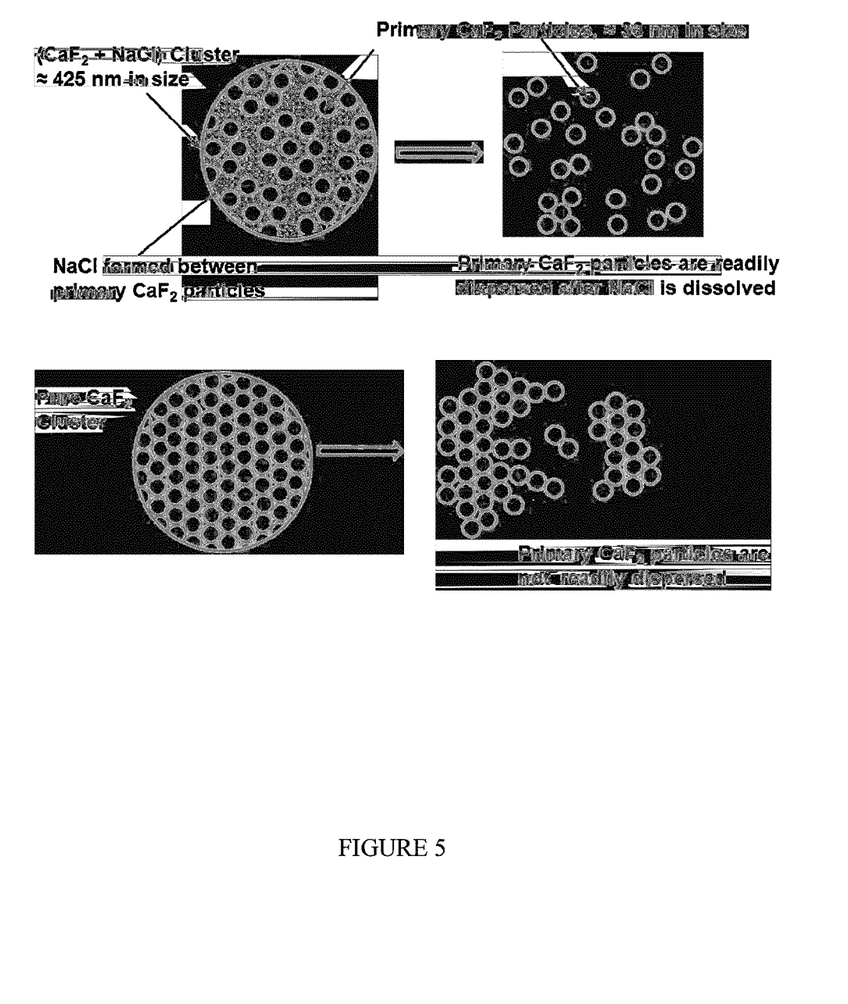
FIG. 5: Schematic drawings of (a) a composite cluster containing $CaF_2$ nanoparticles in the matrix of NaCl, and (b) a cluster containing pure $CaF_2$ nanoparticles. 323×243 mm (600×600 DPI).

Due to the instantaneous atomization and drying process, the spray drying technique makes it possible to co-precipitate two discrete phases with very different solubility into composite particles. To fully understand the process, it is hypothesized that the following sequence of events occurred within each droplet of atomized solution during the spray drying process when preparing pure $CaF_2$: (1) the mixed solution, i.e., $Ca(OH)_2+NH_4F$ in Eqn.1, became progressively more supersaturated with respect to $CaF_2$ as water and $NH_4OH$ were rapidly evaporated, (2) numerous $CaF_2$ nuclei were formed via homogenous nucleation, (3) the nuclei grew larger and closer to each other as the droplet dried out, and (4) formation of a cluster of tightly aggregated primary nano particles. It seems plausible that, as the droplet dries out, the very last portion of the precipitated $CaF_2$ would form at the contact points of the primary particles, bridging them together to form a stable three dimensional network that would hinder ready dispersion of the cluster into free primary particles. Therefore, if a highly soluble compound, such as NaCl, is co-precipitated with $CaF_2$ in the spray-drying process, NaCl precipitation will begin to occur only after formation of the $CaF_2$ primary particles is nearly complete, i.e., after step (3) described above. In this case, NaCl instead of $CaF_2$ will be formed in the spaces between the $CaF_2$ primary particles, leading to formation of a cluster consisting of $CaF_2$ primary particles distributed in a matrix of NaCl (FIG. 5a) rather than a cluster of tightly interlocked $CaF_2$ particles (FIG. 5b). When exposed to an aqueous solution, dissolution of NaCl should lead to dispersion of the $CaF_2$ particles.

The results (FIG. 1-3) show that $CaF_2$/NaCl composite particles are successfully formed through the spray drying process, which has similar morphology and particle size as the pure $CaF_2$ particles prepared previously, i.e., clusters of (50 to 800) nm, consisting of smaller primary particles [11]. Once in the aqueous solution, the NaCl dissolved, releasing the primary $CaF_2$ nanoparticles (FIG. 2). By these means, better dispersed $CaF_2$ nanoparticles with a narrow size distribution (FIG. 2). By these means, better dispersed $CaF_2$ nanoparticles with a narrow size distribution can be obtained (FIG. 2, 4). A potential problem with this process is that multiple phases could form due to the existence of several ions in the solution and the fast precipitation in the spray drying process. XRD pattern of the obtained powders (FIG. 1), however, showed no traces of other phases such as $Ca(OH)_2$, $NH_4F$, $CaCl_2$ or NaF This demonstrated that the least soluble phase, i.e., $CaF_2$ will precipitate first, and the precipitation of the soluble phases, i.e., NaCl, will begin to occur only after formation of the $CaF_2$ primary particles is nearly complete. These results supported the feasibility of the approach for preparing well-dispersed nano particles by incorporating a more soluble phase that can be dissolved subsequently.

Three characterization methods have been used in this study: SEM provided a direct image of particle morphology, size, and degree of particle dispersion or agglomeration: DLS measured the particle size distribution in a liquid: BET determined the size of the primary particles. As the particle size measured by DLS is hydrodynamic diameter within a liquid, the results are very much affected by the liquid or medium. Two media have been used in this study. The 12.8 mmol/L NaCl solution was used for all as-sprayed samples as sample $CaF_2$-3 contained this amount of NaCl when dissolved in water. This medium is close to the one (1) mmol/L NaCl solution) recommended by the international standard for DLS measurement. However, the particle sizes measured this way (Table 2) appeared to be larger when compared to the SEM observations. A separate DLS measurement of $CaF_2$-0 powders in distilled water only gave a value of (497±20) nm (n=3), suggesting that the concentration of the salt in the medium played an important role in the measurement. In addition, to simulate the sample preparation for SEM, ethanol was also used as a medium for DLS measurement of all washed samples (no washing needed for sample $CaF_2$-0). The particle sizes obtained by this method were much smaller compared to those measured in NaCl solution (Table 2). However, the results still seemed slightly larger than the SEM observation, which may be due to both the nature of the technique and the existence of negligible amounts of less dispersed particles that caused the small tail on the right side of the size distribution (FIG. 4). In sum, the incorporation of NaCl during the preparation of $CaF_2$ led to a well dispersed nano $CaF_2$ particles.

As shown in FIGS. 2 and 4 and Table 2, the degree of particle dispersion for the washed samples increased with the percentage of NaCl co-precipitated with $CaF_2$. This is reasonable as the primary $CaF_2$ particles can be better distributed within a larger volume of the NaCl matrix. However, when the NaCl incorporation was too high, some NaCl crystals could precipitate early in the process, i.e., before significant $CaF_2$ precipitation has occurred. Rapid growth of these NaCl crystals could occur simultaneously with the precipitation of $CaF_2$, forming a separate phase rather than as the matrix of the composite clusters (FIG. 2 (a3)). This suggests that there is a limit for the incorporation of NaCl.

When there is particle agglomeration, the particle size estimated by the BET method is usually much smaller than by other methods, because BET methods provide an approximate measure of the size of primary $CaF_2$ particles rather than the true size of the agglomerated particles. In contrast, particle size values obtained from the DLS measurements are more closely related to the true physical size of the particles that may have various degrees of agglomeration. Thus, the degree of particle dispersions/agglomeration can be assessed by comparing the values obtained by the BET and DLS methods. Assuming both the primary particles and the agglomerated particles have spherical shapes and the primary particles and the agglomerated particles have spherical shapes and the primary particles are closed packed in an agglomerated particle, we can define the degree of agglomeration (DA) as the averaged number of primary particles contained in the agglomerated particles, which can be estimated by.

$$DA = \text{volume of composite cluster/volume of primary particle} = (d_{DLs2}/d_{BET})^3 \quad \text{(Eqn. 2)}$$

By using the mean primary particle size of 36 nm and the DLS Z-average particle size in ethanol, i.e., $d_{DLs2}$ in Table 2, the DA values ranged from 2020 for $CaF_2$-0 and 85 for $CaF_2$-3 Alternatively, if using the median particle size in FIG. 4, i.e., 425 nm for $CaF_2$-0 and 75 nm for $CaF_2$-3, the DA values for $CaF_2$-0 and $CaF_2$-3 were respectively 1645 and 9 These results suggest that our approach is very effective in obtaining better-dispersed nanoparticles. Nonetheless, there were still negligible amounts of less dispersed particles, as revealed by both DLS and SEM.

Example B

Preparation of Nano Amorphous HA
(Hydroxyapatite)

Figure 6:
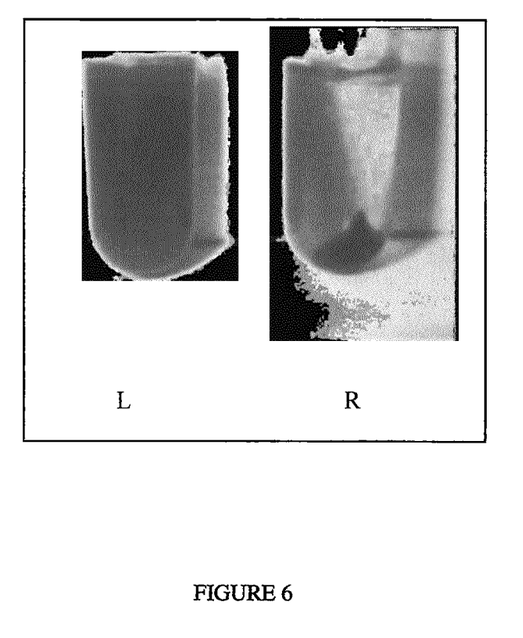
FIG. 6: Photograph of suspension of a blue dye—incorporated nano amorphous HA (left); after centrifugation (right).

Nano particles of a composite consisting of HA, NaCl and Brilliant blue dye (CAS Registry Number: 3844-45-9) were synthesized by simultaneously feeding to a two liquid nozzle (1) a solution containing 4 mM $Ca(OH)_2$ and 3.44 mM NaCl, and (2) a solution containing 2.4 mM $H_3PO_4$ and 0.032 g/L of blue dye and spray dried as previously described. The product would have a HA:NaCl mass ratio of 2:1, and the blue dye content of 5 mass %. The collected product was twice washed in distilled water (10 mg/mL) to dissolve the NaCl followed by centrifugation. The supernatant was essentially colorless (FIG. 6), indicating that little or no dye was incorporated into the NaCl phase during the spray drying process. This was expected because large dye molecule is likely to be excluded from NaCl, which has a simple and tight crystal structure. In contrast, the nano amorphous HA particles showed a dark blue color indicating that the large dye molecules were trapped in the HA phase by co-precipitation. These results demonstrate using the technique to incorporate drug molecules (analogous to the blue dye) in HA nano particles by the spray drying method.

DLS measured particle size of the this HA was 228±8 nm (n=3), which is significantly smaller than the size (380±49 nm) of a similarly prepared amorphous HA without the NaCl matrix reported by "Sun L M, Chow L C, Frukhtbeyn S A, Bonevich J E (2010): *Preparation and Properties of Nanoparticles of Calcium Phosphates with Various Ca/P Ratios*. J Res Natl Inst Stand Technol 115: 243-255."

It should be noted that, in addition to using NaCl as the matrix phase, other soluble compounds such as potassium nitrate, sodium fluoride, etc., can also be used to obtain similar results. In general, this technique can be used to produce better dispersed nanoparticles for any system as long a (1) the nanoparticles to be prepared are significantly less soluble than the matrix material (on the order of at least 20 times more soluble), and (2) none of the constituents of the matrix material would produce undesired effects on the composition of the nanoparticles being prepared.

This approach is, for example, applicable in preparing better-dispersed calcium phosphate nanoparticles for drug delivery and gene therapy. That is, in the present invention, calcium fluoride, the nano particles to be prepared, has a solubility (in water) of about 0.018 g/L, whereas that of the matrix, sodium chloride, is about 359 g/L. Similarly, solubility of other calcium phosphates are approximately: DCPD (0.15 g/L), DCPA (0.074 g/L), ACP (0.021 g/L), and HA (0.00066 g/L). All of the above have solubility values over 1000 times smaller than that of sodium chloride, therefore requirement (1) above is well satisfied. Since sodium chloride would not significantly interact with calcium phosphate formation in the spray drying process, requirement (2) is also fully met.

A large number of other compounds can also satisfy the two requirements and are good candidates for use the matrix. Non-toxic and biocompatible examples may include mannitol, sucrose, when water is used as the solvent in the spray drying process. If the nano particles to be prepared are not for biomedical uses, additional compounds can be involved.

While there has been set forth various embodiments of the invention and the processes practiced, the invention is to be limited only by the following claims and equivalents thereof.

What is claimed is:

1. A method for preparation of discrete $CaF_2$ nanoparticles comprising the steps of:
   a) providing a soluable biocompatible salt and $NH_4F$ first liquid solution;
   b) providing a soluble biocompatible salt and $Ca(OH)_2$ second liquid solution;
   c) simultaneously feeding the first and second solutions through a spray vaporizing and drying apparatus to form a composite of $CaF_2$ particles in a salt matrix; and
   d) collecting the composite particles and matrix.

2. The method of claim 1 wherein the salt is NaCl.

3. The method of claim 2 wherein the molar ratios of $CaF_2$/NaCl are in the range of about 10:1 to 1:10.

4. The method of claim 3 wherein the molar ratios of $CaF_2$/NaCl are in the range of 4:1 to 1:4.

5. The method of claim 1 wherein a solvent of the first solution is selected from the group consisting of water, alcohols, acetone, alkylhalides, dimethylsulfoxide (DMSO) and combinations thereof and a solvent of the second solution is selected from the group consisting of water, alcohols, acetone, alkylhalides, dimethylsulfoxide (DMSO) and combinations thereof.

6. The method of claim 1 including the step of separating the particles and matrix by dissolution of the matrix and collecting the particles.

7. A method for preparation of discrete, generally unagglomerated nanoparticles of $CaF_2$ comprising the steps of:
   (a) simultaneously spraying a first liquid solution and a second liquid solution into the same region having a drying gas atmosphere maintained at an ambient pressure and temperature, said first solution comprising $NH_4F$, a biocompatible solvent and a solubilized salt selected from the group consisting of a biocompatible anionic salt and combinations of anionic biocompatible salts that are more soluble than $CaF_2$ in the same solvent, and said second solution comprising a solubilized biocompatible calcium compound essentially free of F;
   (b) deliquifying the resultant combined spray to form $CaF_2$ particles in a matrix of said soluble salt, the solubility of said salt greater than the solubility of said $CaF_2$ in a solvent of said salt;
   (c) liquefying the matrix with said solvent; and
   (d) separating the $CaF_2$ particles from the liquefied matrix solution.

8. A method for preparation of discrete nanosized particles of a soluble ionic compound comprising the steps of:
   (a) forming a first solution of an anion source of said compound and a first salt;
   (b) forming a second solution of a cation source of said compound and a second salt, said salts being more soluble than said compound in the same solvent;
   (c) simultaneously spray drying said solutions together to form said compound in the form of nanosized particles in a matrix of said salt; and
   (d) dissolving the matrix.

9. The method of claim 8 wherein the first and second salts are identical.

10. The method of claim 8 wherein the anion source is $NH_4F$, the cation source is $Ca(OH)_2$, the salt is NaCl and the solvent is water.

11. The method of claim 8 wherein the solubility of the salt is at least about 20 times the solubility of the compound.

* * * * *